US011595843B2

(12) United States Patent
Lu et al.

(10) Patent No.: US 11,595,843 B2
(45) Date of Patent: Feb. 28, 2023

(54) METHODS AND NETWORK NODES FOR HANDLING BASEBAND PROCESSING

(71) Applicant: Telefonaktiebolaget LM Ericsson (publ), Stockholm (SE)

(72) Inventors: Chenguang Lu, Sollentuna (SE); Johan Zhang, Solna (SE); Miguel Berg, Sollentuna (SE); Daniel Cederholm, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 16/958,096

(22) PCT Filed: Dec. 29, 2017

(86) PCT No.: PCT/SE2017/051358
§ 371 (c)(1),
(2) Date: Jun. 25, 2020

(87) PCT Pub. No.: WO2019/132745
PCT Pub. Date: Jul. 4, 2019

(65) Prior Publication Data
US 2020/0344635 A1 Oct. 29, 2020

(51) Int. Cl.
*H04W 28/02* (2009.01)
*H04W 76/15* (2018.01)
*H04W 88/10* (2009.01)

(52) U.S. Cl.
CPC ... *H04W 28/0263* (2013.01); *H04W 28/0236* (2013.01); *H04W 76/15* (2018.02); *H04W 88/10* (2013.01)

(58) Field of Classification Search
CPC ......... H04W 28/0236; H04W 28/0263; H04W 76/15; H04W 88/10; H04L 47/56; H04L 47/24; H04L 47/283; H04L 47/20
See application file for complete search history.

(56) References Cited

U.S. PATENT DOCUMENTS

2003/0085837 A1* 5/2003 Abraham ................ G01S 19/29
342/357.64
2010/0091920 A1* 4/2010 Alexander ............ H04L 1/0054
375/350
(Continued)

FOREIGN PATENT DOCUMENTS

WO 2016060823 A1 4/2016
WO 2016099369 A1 6/2016

OTHER PUBLICATIONS

International Search Report and Written Opinion for International Application No. PCT/SE2017/051358, dated Sep. 25, 2018, 12 pages.
(Continued)

*Primary Examiner* — Margaret G Mastrodonato
(74) *Attorney, Agent, or Firm* — Nicholson De Vos Webster & Elliott LLP

(57) ABSTRACT

A first network node, a second network node and methods therein, for handling baseband processing of signals communicated with wireless devices in a wireless network. The first network node communicates a first type of signals with a first wireless device and performs a first part of baseband processing of the first type of signals using a non-GPP implemented processor. The first network node also communicates the first type of signals with the second network node for a second part of baseband processing of the first type of signals using a GPP implemented processor. The first network node further communicates a second type of signals with a second wireless device and performs both of said first and second parts of baseband processing of the second type of signals using the non-GPP implemented processor.

20 Claims, 5 Drawing Sheets

(56) References Cited

U.S. PATENT DOCUMENTS

| | | | |
|---|---|---|---|
| 2016/0124899 A1* | 5/2016 | Vasishta | G06F 15/7889 |
| | | | 712/35 |
| 2017/0188412 A1 | 6/2017 | Noriega et al. | |
| 2017/0264535 A1 | 9/2017 | Choi et al. | |
| 2017/0272365 A1* | 9/2017 | Wei | H04L 45/302 |
| 2018/0139726 A1* | 5/2018 | Choi | H04L 67/1082 |
| 2020/0183741 A1* | 6/2020 | Tang | H04W 28/24 |
| 2020/0221531 A1* | 7/2020 | Gao | H04W 88/085 |

OTHER PUBLICATIONS

3GPP TR 38.801, "3rd Generation Partnership Project; Technical Specification Group Radio Access Network; Study on New Radio Access Technology; Radio Access Architecture and Interfaces (Release 14)," Mar. 2017, 90 pages, V2.0.0, 3GPP Organizational Partners.
International Preliminary Report on Patentability for International Application No. PCT/SE2017/051358, dated Jul. 9, 2020, 10 pages.
Communication pursuant to Article 94(3) EPC for EP Application No. 17832108.9, dated Mar. 29, 2022, 5 pages.

* cited by examiner

METHODS AND NETWORK NODES FOR HANDLING BASEBAND PROCESSING

CROSS-REFERENCE TO RELATED APPLICATIONS

This application is a National stage of International Application No. PCT/SE2017/051358, filed Dec. 29, 2017, which is hereby incorporated by reference.

TECHNICAL FIELD

The present disclosure relates generally to a first network node, a second network node and methods therein, for handling baseband processing of signals communicated with wireless devices in a wireless network.

BACKGROUND

In wireless networks of today, network nodes including base stations such as eNBs for 4G networks, access points such as WiFi access points, have functionality for baseband processing of both incoming and outgoing signals used for communication with wireless devices. Operations related to baseband processing may e.g. include signal modulation/demodulation, detection, encoding/decoding, radio frequency shifting and Fast Fourier Transform operations, as well as layer 2 operations such as scheduling. These baseband operations and others are typically executed by Digital Signal Processors, DSPs or dedicated hardware chipsets such as Application-Specific Integrated circuits, ASICs, or by Field Programmable Gate Arrays, FPGAs.

For ASIC-based systems, the hardware chipsets are hard-coded and thus not possible to re-program, meaning that only predefined configurations are available. If a function on the chipset needs to modified, deleted or added, it is basically necessary to replace the chipset by a new one.

DSP-based systems are programmable such that DSP software can be modified, e.g. to add new functionalities. However, DSP programming and DSP software testing is quite difficult, complex and time consuming to perform, using low level programming languages such as C and/or Assembler. Therefore, the development costs for a DSP system are typically very high. Further, the code compatibility is usually limited between a new generation and older generations of the DSPs, even for the same DSP "families". Consequently, modification of the DSP software is required in order to migrate from older generations to a new generation, resulting in substantial migration costs.

For an FPGA-based design, the FPGA firmware can be reprogrammable using hardware description languages (HDL). However, it is often even more complex and time consuming than DSP programming.

In future networks, it can be foreseen that several different Radio Access Technologies, RATs, will be used for different types of wireless devices, and some RATs that can be expected include LTE for mobile phones, WiFi for enterprise applications, NB-IoT (Narrow Band Internet-of-Things), CAT-M1 (LTE-M) and LoRa for low-power in wide-area MTC (Machine Type Communication), BLE (Bluetooth Low Energy) and IEEE 802.15.4, such as Zigbee, for short-range communications. For some complex scenarios such as "smart factory", it is necessary to support several RATs at the same location which can be done by employing multiple network nodes at the same site, one for each RAT.

The technology in this field is currently developed so that a single network node should be able to communicate and handle baseband processing according to multiple RATs, which can be accomplished by employing a dedicated chipset for each RAT in the network node. Sometimes multiple RATs are packaged into one multi-radio chipset which may be integrated with both WiFi and LTE.

FIG. 1 illustrates such a multi-RAT network node 100 which is capable of communicating with a first type of wireless devices 102 using a first RAT, RAT1, and also with a second type of wireless devices 104 using a second RAT, RAT2. The first type of wireless devices 102 may include NB-IoT devices which are only capable of short-range communication and the second type of wireless devices 104 may include an LTE device which is capable of communication over greater distance. The network node 100 thus needs to be capable of using both RAT1 and RAT2 to serve both types of devices 102, 104.

One way to support multi-RATs is to use a sophisticated DSP-based platform for baseband processing. Such DSPs are often integrated with HW accelerators for complex baseband processing tasks which may include FFT (Fast Fourier Transform), turbo coder and some GPP (General-Purpose Processor) cores for higher layer handling such as layer 3 and above, management and control. These DSPs are often customized and highly optimized for implementing specific standards, e.g. in terms of required processing capability, memory and storage capacity.

The only possible way to increase the processing capacity, is to redesign the DSP system hardware, such as a DSP board, by adding more parallel DSPs. Usually, a new generation of DSPs is needed to support new standards since the existing DSPs may become a limitation for the overall design and development. The life cycle for different DSP generations is usually quite long, meaning that each generation of DSP is used for a quite long time. As stated before, the DSP software development is complex, time consuming and costly.

To support a new RAT on a DSP-based system, this further increases the implementation difficulties and costs to develop the new DSP software on the existing DSPs which are not adapted and optimized for the new RAT. Some limited hardware resources, e.g. memory, need to be shared between two implementations. This may also limit the implementation of some advanced features of the new RAT. The existing DSP platform may also limit the scalability for the new RAT. For example, when implementing NB-IoT technology on an existing eNB, the scalability of the existing DSP platform is designed for MBB (mobile broadband) technology which is not optimized for the scalability required by the IoT use cases, as the number of the IoT devices are expected much larger than the number of mobile phones.

As discussed above, the chipset, DSP and FPGA based designs for a network node have a drawback of limited flexibility for updated functionality and adaption to increased traffic, also referred to as scalability. The required hardware and software development is thus both costly and time consuming.

Moreover, it can be foreseen that the number of autonomous MTC or IoT devices will be much larger than the number of handheld mobile phones, and the former type of devices should further consume as little power as possible to reduce the need for battery recharging or replacement. Further, such MTC or IoT devices, e.g. using short-range communication technologies like BLE and Zigbee, can only be located close to their serving network node and they also communicate relatively seldom, e.g. to send brief messages such as measurement reports at regular intervals, thus typically having very low throughput. As a result, a great number of network nodes are needed to serve such MTC or IoT devices at short distance and to upgrade their hardware processors, basically by replacing the exiting network nodes with new network nodes, would be very costly.

It has also been proposed to employ Software Defined Radio, SDR, which is a concept to fully "softwarize" various baseband processing operations on GPP-based platforms, e.g. based on X86 CPUs (Central Processing Units). However, using GPP would increase delays in the baseband processing which may not be acceptable for some types of traffic. The total delay include several factors such as bus delay, processing delay, and scheduling delay in the operating system. As indicated by its name, GPP processors are designed for executing variable tasks for a general purpose, but they are not fully optimized for digital signal processing. Therefore, GPP processors have limited capacity for baseband processing which may not be sufficient for communications using complex and sophisticated protocols such as 4G and 5G as defined by the 3rd Generation Partnership Project, 3GPP.

SUMMARY

It is an object of embodiments described herein to address at least some of the problems and issues outlined above. It is possible to achieve this object and others by using methods and network nodes as defined in the attached independent claims.

According to one aspect, a method is performed by a first network node for handling baseband processing of signals communicated with wireless devices in a wireless network. In this method, the first network node communicates a first type of traffic signals with a first wireless device, and performs a first part of baseband processing of the first type of traffic signals using a non-GPP implemented processor. The first network node further communicates the first type of traffic signals with a second network node for a second part of baseband processing of the first type of traffic signals using a GPP implemented processor.

The first network node also communicates a second type of traffic signals with a second wireless device, and performs both of said first and second parts of baseband processing of the second type of traffic signals using the non-GPP implemented processor.

According to another aspect, a first network node is arranged to handle baseband processing of signals communicated with wireless devices in a wireless network. The first network node is configured to communicate a first type of traffic signals with a first wireless device, and to perform a first part of baseband processing of the first type of traffic signals using a non-GPP implemented processor. The first network node is further configured to communicate the first type of traffic signals with a second network node for a second part of baseband processing of the first type of traffic signals using a GPP implemented processor.

The first network node is also configured to communicate a second type of traffic signals with a second wireless device, and to perform both of said first and second parts of baseband processing of the second type of traffic signals using the non-GPP implemented processor.

According to another aspect, a method is performed by a second network node for handling baseband processing of signals communicated with wireless devices in a wireless network. In this method, the second network node communicates a first type of traffic signals with a first network node where a first part of baseband processing of the first type of traffic signals is performed using a non-GPP implemented processor. The second network node further performs a second part of baseband processing of the communicated first type of traffic signals using a GPP implemented processor.

According to another aspect, a second network node is arranged to handle baseband processing of signals communicated with wireless devices in a wireless network. The second network node is configured to communicate a first type of traffic signals with a first network node where a first part of baseband processing of the first type of traffic signals is performed using a non-GPP implemented processor, and to perform a second part of baseband processing of the communicated first type of traffic signals using a GPP implemented processor.

When employing the above methods and network nodes, it is an advantage that a non-GPP based network architecture can be kept unchanged in the first network node for delay-sensitive traffic types while maintaining a high network performance. Further, an existing non-GPP based network node design can be reused as more delay-tolerant traffic types are offloaded to a GPP-based system/platform in the second network node.

The above methods and network nodes may be configured and implemented according to different optional embodiments to accomplish further features and benefits, to be described below.

A computer program is also provided comprising instructions which, when executed on at least one computer in either of the first and second network nodes, cause the at least one computer to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
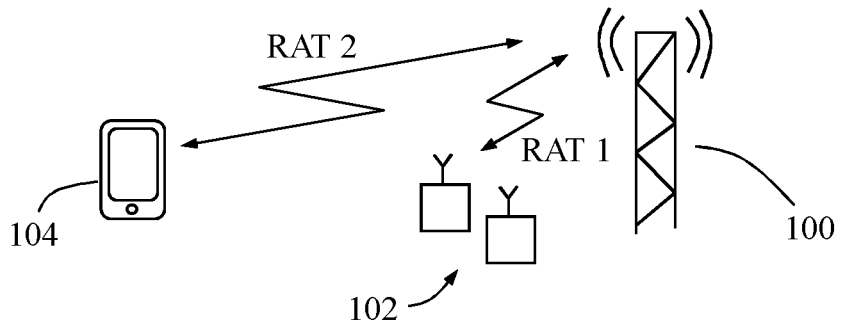
FIG. 1 is a communication scenario illustrating a network node capable of multiple RATs, according to the prior art.

Briefly described, a solution is provided to enable flexibility in a network node without causing excessive costs by employing a non-GPP implemented processor in a first network node and a GPP implemented processor in a second network node for baseband processing of one type of traffic which may be relatively tolerant to delays, and by employing the non-GPP implemented processor only for baseband processing of another type of traffic which may be more delay-sensitive. The above two traffic types may use different RATs with different computational demands and latency requirements.

Thereby, the non-GPP implemented processor in the first network node can be off-loaded by not having to perform all baseband processing tasks for both types of traffic. Scalability and new functionalities can also be easily provided by means of the GPP based system or platform in the second network node which is less complex and costly to re-program and test, compared to the non-GPP based system or platform. The GPP implemented processor in the second network node could be accessed and obtained from a pool of processing resources, while the somewhat less flexible non-GPP implemented processor in the first network node can be utilized for more computational-intensive and delay-sensitive types of traffic. In the following description, the non-GPP implemented processor will be denoted non-GPP processor for short, and the GPP implemented processor will be denoted GPP processor for short. Throughout this disclosure, the term "processor" should be understood in a logic sense and could also be replaced by "processing device" or similar.

It is an advantage that the non-GPP based network architecture in the first network node can be kept unchanged for delay-sensitive traffic types and the network performance can also remain very high for such traffic types which may use RATs such as LTE, 5G NR and WiFi. At the same time, the existing non-GPP based network node design (e.g. BBU, eNB) can be reused and any DSP software or FPGA firmware changes are minimized to offload more delay-tolerant traffic types to a GPP-based system/platform in the second network node. These delay-tolerant traffic types may use RATs such as NB-IoT, CAT-M1 (LTE-M), BLE and IEEE 802.15.4. For an ASIC-based system, a redesign of the ASIC will require very little changes, e.g. adding an interface between the first and second network nodes to exchange baseband signals over that interface for baseband processing.

One type of traffic may e.g. be for IoT such as NB-IoT, CAT-M1 (LTE-M), BLE or IEEE 802.15.4, or for legacy 3GPP such as GSM and WCDMA, where the performance requirements are generally lower. For example, IoT traffic can be regarded as "best effort" traffic providing non-critical services to end-users. It is sufficient to use a GPP for baseband processing to reduce system costs while achieving sufficiently good performance and better scalability than non-GPP.

In this description, the term "non-GPP implemented processor" represents a processor or processing device that is designed for digital signal processing using a processing platform other than the GPP platform. Examples of a non-GPP implemented processor include a HW (hardware) based processor such as an ASIC or chipset, a DSP (Digital Signal Processor), and an FPGA (Field Programmable Gate Array). For completeness, the term "GPP implemented processor" further represents a processor or processing device that is designed for a general purpose (mainly for control tasks), which is commonly also referred to as CPU (Central Processing Unit) such as Intel X86, ARM, MIPS CPUs, which are typically used in PCs, workstations, servers and data centers.

The solution will be described herein in terms of functionality of a first network node using a non-GPP processor for baseband processing and a second network node using a GPP processor for baseband processing. For example, the non-GPP processor may reside in a base station or similar while the GPP processor may reside in a node other than the base station such as a dedicated node in the network or a pool or center with available processing resources, e.g. a data center. In other words, the second network node as described herein could be implemented in any of a server, a cluster of servers and a pool of processors, which may reside in a data center or the like. The first and second network nodes may communicate with each other using optical fibers or any other suitable communication links. The term "network node" should thus be understood as a logic entity having the functionality described herein, regardless of physical implementation.

The embodiments herein may for example be used to extend the current conventional base station design with a GPP-based platform to support baseband processing for multiple RATs. Basically, the baseband processing for any highly computational intensive (e.g. wideband, high throughput) technologies and for technologies requiring low latency can be processed on the non-GPP-based base station, while the baseband processing for any less computational intensive (narrowband, low throughput) technologies and technologies tolerating high latency can be partly processed on the GPP-based platform. To accomplish this, an additional FH (Fronthaul) interface may be used between the non-GPP-based base station and the GPP-based platform. This FH interface and the backhaul interface of the base station may share the same network port.

The embodiments herein may further be used when operation of the first network node is split into an RRU (Remote Radio Unit) and a central BBU (Baseband Unit) where baseband processing is performed in the BBU. For RATs processed on the GPP-based platform, the non-GPP-based base station may in this case basically appear as the RRU for those RATs while the GPP-based platform may basically act as the BBU. The non-GPP-based base station can be employed to perform partial processing, like performing certain baseband functional split where some baseband functions are in one node and the rest are in another node, e.g. PHY-RF split, Intra-PHY split, FH compression to reduce the FH bit rate, etc., for the RATs supported by the GPP platform. In this way, the non-GPP-based base station can act as a "master node" controlling where the RATs are processed and the GPP-based platform can act as a "slave node" to support some RATs to offload the baseband processing in the non-GPP-based base station.

Figure 2:
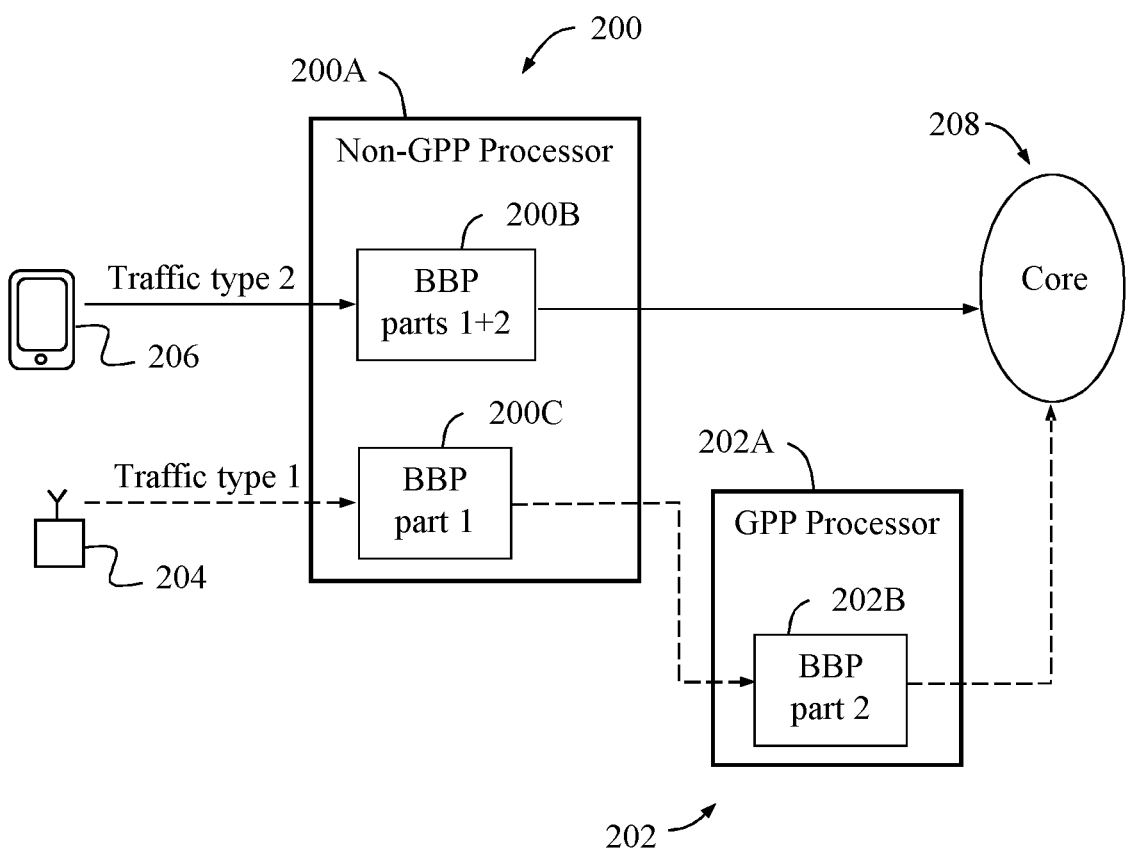
FIG. 2 is a communication scenario illustrating an example of how the solution may be employed, according to some example embodiments.

FIG. 2 illustrates a communication scenario where the solution is employed in a first network node 200 to serve both a wireless device 204 using a first traffic type and also a wireless device 206 using a second traffic type. Even though the arrows in this figure indicate uplink communication, it should be understood that the scenario is also applicable for downlink communication. Throughout this disclosure, it should further be understood that that "communicate signals" with any wireless device means either receive signals or transmit signals over the air. The wireless device 204 could be an NB-IoT device and communicates a first type of traffic signals, either in uplink or downlink. In this example, the wireless device 206 is illustrated as a mobile phone and communicates a first type of traffic signals, likewise either in uplink or downlink. Throughout this description, it should be understood that traffic signals may carry any information which can be generally referred to as "data", and the embodiments and examples herein are not limited to any particular information or data in the traffic signals.

The first network node 200 includes a non-GPP processor 200A which may reside in a non-GPP-based base station. The second network node 202 includes a GPP processor 202A which may reside in a server, a cluster of servers, or a pool of processors of a data center, e.g. in a cloud-like environment. The terms GPP processor and non-GPP processor have been explained above and although only one non-GPP processor 200A and one GPP processor 202A are mentioned and shown for simplicity, it should be noted that any number of non-GPP processors and GPP processors could be used in the procedures described herein. The non-GPP processor 200A and the GPP processor 202A can be used for performing different parts of baseband processing depending on the type of traffic signals, to be described in more detail below.

The first type of traffic signals may be relatively tolerant to delays in baseband processing, while the second type of traffic signals may be more sensitive to delays in baseband processing. A predefined delay threshold in terms of baseband processing time may be used to distinguish the first and second types of traffic signals as follows:

The first type of traffic signals (type 1) is tolerant to baseband processing delays above the predefined delay threshold. In other words, type 1 traffic has delay requirements above the delay threshold.

The second type of traffic signals (type 2) requires that baseband processing delays do not exceed the predefined delay threshold. In other words, type 2 traffic has delay requirements below the delay threshold.

As mentioned above, the total delay in baseband processing may include a bus delay, a processing delay, and a scheduling delay. Using such a delay threshold to distinguish the first and second traffic types in terms of delay requirements, makes it possible to control the distribution of traffic load to the processors 200A, 202A by adjusting the delay threshold. For example, if the GPP processor 202B is upgraded to achieve shorter processing delay, e.g. by upgrading the server with fast CPUs, improving the baseband software implementation, and/or OS upgrade, the delay threshold could be reduced to increase the amount of first type traffic with delay requirements above the threshold which would distribute more traffic to the GPP processor 202B. For example, BLE communications require about 150 microsecond round-trip delay. If the GPP based platform is upgraded to fulfil the delay requirement of BLE, then the BLE traffic can be offloaded to the GPP based platform.

The first type of traffic signals may also require less complex baseband processing, e.g. narrow band and low throughput, while the second type of traffic signals may require more complex baseband processing, e.g. wideband and high throughput. The processing complexity may be dependent on the communication protocols used for the respective traffic signal types.

FIG. 2 further illustrates that the non-GPP processor 200A performs a first part (part 1) of the baseband processing for the first traffic type, as schematically indicated by a block 200C. The signals of the first traffic type are then transferred from the first network node 200 to the second network node 202 and the GPP processor 202A which performs a second part (part 2) of the baseband processing for the first traffic type, as schematically indicated by a block 202B. After that, data from the first traffic type are sent from the GPP processor 202B to a core network 208 for further handling of the data traffic, which lies outside the scope of the embodiments herein.

It is an advantage that the non-GPP capability and/or the existing software functionality on the non-GPP system or platform can be reused for the first traffic type. For example, the first part of the baseband processing may include operations of pre-processing the signals such as Fast Fourier Transform and/or Filterbank, and the second part of baseband processing would in this case include one or more baseband operations other than said signal pre-processing operation such as modulation/demodulation, channel estimation, FEC coding/decoding, scheduling etc. As a result, the majority of the baseband processing of the first type of traffic is moved to the GPP system or platform to offload the baseband processing of the non-GPP system, as well as requiring very little change and development of the non-GPP system.

FIG. 2 also illustrates that the non-GPP processor 200A performs both the first part and the second part of the baseband processing for the second traffic type, as schematically indicated by a block 200B. After that, the data of the second traffic type are sent from the non-GPP processor 200A to the core network 208 for further handling of the signals. It was indicated above that the first network node 200 may in practice include more than one non-GPP processor. It should also be noted that the first part of the baseband processing could be performed by one non-GPP processor in the first network node for the first traffic type, while the first and second parts of the baseband processing could be performed by another non-GPP processor in the first network node for the second traffic type.

Thereby, the non-GPP processor 200A can be off-loaded by distributing the second part of baseband processing to the GPP processor 202A for the first traffic type. As mentioned above, the overall processing delay of the GPP platform determines which RATs can be offloaded to the GPP. When the second traffic type has strict latency requirements, e.g. requiring that baseband processing delays must not exceed a delay threshold, it can be ensured that these requirements are fulfilled by letting all baseband processing of the second traffic type, i.e. both the first and second parts, be performed by the non-GPP processor 200A which is associated with shorter processing delays compared to the GPP processor 202A.

An example will now be described with reference to the flow chart in FIG. 3A, of how the solution may be employed in terms of actions performed by a first network node such as the above-described first network node 200. FIG. 3 is described below with further reference to FIG. 2 although without limitation to such a communication scenario involving the first network node 200. Some optional example embodiments that could be used in this procedure will also be described below.

Figure 3A:
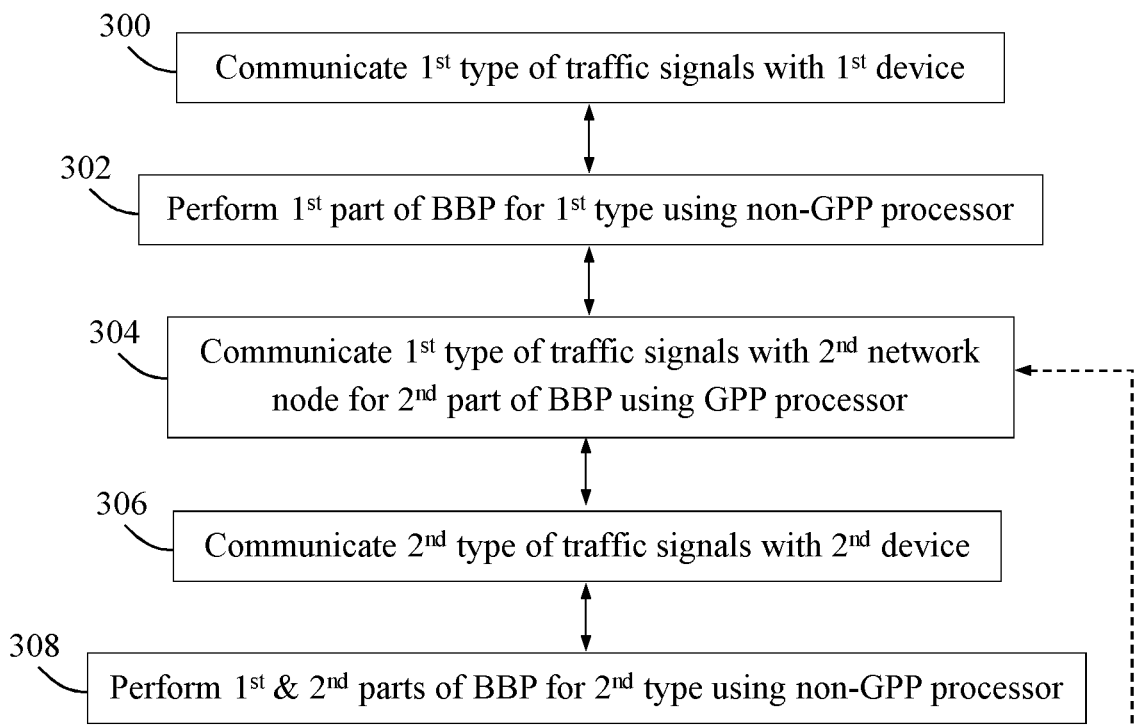
FIG. 3A is a flow chart illustrating a procedure in a first network node, according to further example embodiments.

The actions shown in FIG. 3A are thus performed by a first network node 200 for handling baseband processing of signals communicated with wireless devices in a wireless network. In this procedure, the first network node 200 may in some non-limiting examples be implemented in a base station or a WiFi access point, and the solution is not limited in this respect.

A first action 300 illustrates that the first network node 200 communicates a first type of traffic signals with a first wireless device 204. In another action 302, the first network node 200 performs a first part of baseband processing of the first type of traffic signals using a non-GPP implemented processor 200A, e.g. as illustrated in block 200C. In another action 304, the first network node 200 communicates the first type of traffic signals with a second network node 202 for performing a second part of baseband processing of the first type of traffic signals using a GPP implemented processor 202A, e.g. as illustrated in block 202B. It should be noted here that in this action "communicates" means either to send the signals to the second network node 202 in the case of uplink communication with the first wireless device, or to receive the signals from the second network node 202 in the case of downlink communication with the first wireless device.

A further action 306 illustrates that the first network node 200 also communicates a second type of traffic signals with a second wireless device 206. In another action 308, the first network node 200 performs both of said first and second parts of baseband processing of the second type of traffic signals using the non-GPP implemented processor 200A, e.g. as illustrated in block 200B. It should be noted that actions 300-304 may occur before or after, or even at the same time, as actions 306-308, meaning basically that the first and second types of traffic signals may be communicated and processed at any time independent of one another.

It should further be noted that the actions in this figure could basically be performed in the shown order for uplink communication with the wireless devices where the first and second types of signals are received from the wireless devices in actions 300, 306 before the baseband processing. On the other hand, the actions could basically be performed in a reverse order for downlink communication with the wireless devices, where the first and second types of signals are transmitted to the wireless devices in actions 300, 306 after the baseband processing. The alternatives of uplink and downlink communication are indicated by two-way arrows between the actions.

Some optional and non-limiting example embodiments that could be used in this procedure will now be described.

In one example embodiment, the first type of traffic signals may tolerate a certain baseband processing delay while the second type of traffic signals may not tolerate said baseband processing delay. In this case, another example embodiment may be that the first type of traffic signals is tolerant to baseband processing delays above a predefined delay threshold, and that the second type of traffic signals requires that baseband processing delays do not exceed the predefined delay threshold.

In another example embodiment, the traffic signals of the first type may be communicated using a first Radio Access Technology, RAT, and traffic signals of the second type may be communicated using a second RAT. In this case, further example embodiments may be that the first RAT involves any of: Low-Power Wide-Area radio, Narrow Band radio and short-range radio such as NB-IoT, CAT-M1 (LTE-M), BLE, IEEE 802. 15.4 for Machine Type Communication, MTC, and the second RAT involves wideband or high throughput radio such as LTE, 5G or WiFi for wireless broadband applications.

In further example embodiments, the first part of baseband processing may include a signal pre-processing operation such as Fast Fourier Transform and/or Filterbank, and the second part of baseband processing may then include one or more baseband operations other than said signal pre-processing operation such as modulation/demodulation, channel estimation, FEC coding/decoding and scheduling.

In further example embodiments, the non-GPP implemented processor may comprise any of an Application-Specific Integrated Circuit, ASIC, a Digital Signal Processor, DSP, and an FPGA.

In another example embodiment, the GPP implemented processor in the second network node may be accessed from a pool of processing resources.

In another example embodiment, the traffic signals of the first type may be communicated on a first antenna carrier stream, and the traffic signals of the second type may in that case communicated on a second antenna carrier stream separate from the first antenna carrier stream.

In another example embodiment, the traffic signals of the first type and the traffic signals of the second type may be communicated on a common antenna carrier stream. In that case, another example embodiment may be that the traffic signals of the first type could be communicated in-band in one or more resource blocks of a carrier used for the traffic signals of the second type or in a guard band between adjacent carriers used for the traffic signals of the second type.

Figure 3B:
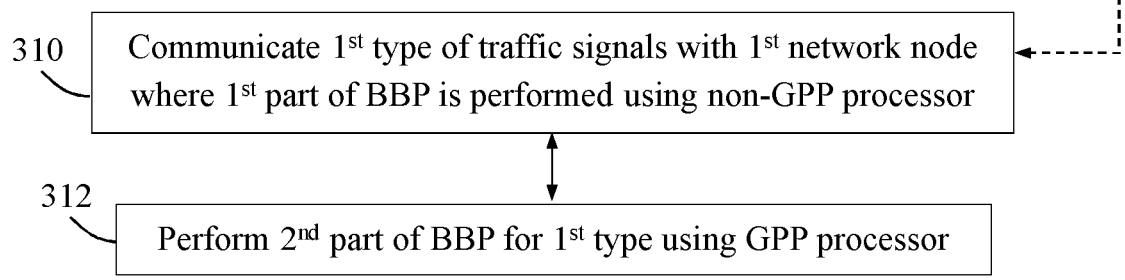
FIG. 3B is a flow chart illustrating a procedure in a second network node, according to further example embodiments.

An example will now be described with reference to the flow chart in FIG. 3B, of how the solution may be employed in terms of actions performed by a second network node such as the above-described second network node 202, and the procedure in FIG. 3B is associated with the procedure in FIG. 3A as follows. FIG. 3B is described below likewise with further reference to FIG. 2 although without limitation to such a communication scenario involving the second network node 202.

The actions shown in FIG. 3B are thus performed by a second network node 202 for handling baseband processing of signals communicated with wireless devices in a wireless network. In this procedure, the second network node 202 may be implemented in a server, a cluster of servers or in a pool of processing resources, and the solution is not limited in this respect.

An action 310 illustrates that the second network node 202 communicates a first type of traffic signals with a first network node 200 where a first part of baseband processing of the first type of traffic signals is performed using a non-GPP implemented processor 200A. This action is thus performed after action 306 in the case of uplink communication with the first wireless device, or before action 306 in the case of downlink communication with the first wireless device.

In another action 312, the second network node 202 performs a second part of baseband processing of the communicated first type of traffic signals using a GPP implemented processor 202A. Similar to FIG. 3A, the actions in FIG. 3B could be performed in the shown order for uplink communication where the first type of traffic signals are received from the first network node in action 310 before the baseband processing in action 312, or in a reverse order for downlink communication where the first type of traffic signals are sent to the first network node in action 310 after the baseband processing in action 312. The alternatives of uplink and downlink communication are indicated by a two-way arrows between actions 310 and 312.

Figure 4:
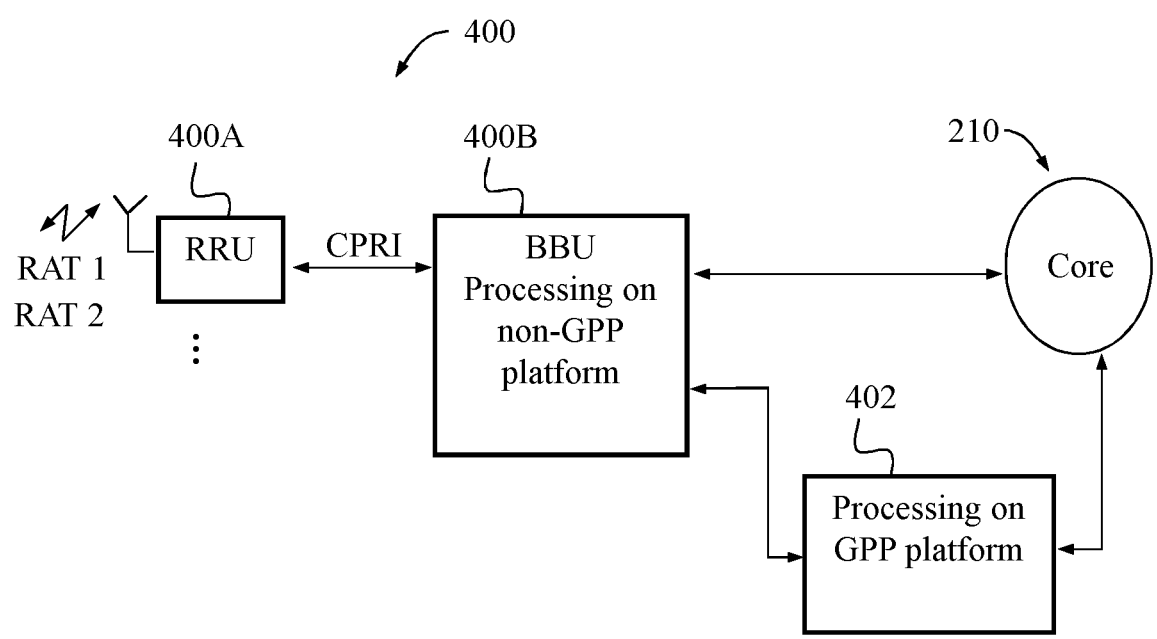
FIG. 4 is a block diagram illustrating an example of how the solution may be employed in a first network node that is split into one or more remote radio units and a central baseband unit, according to further example embodiments.

Another example of how the embodiments herein may be used in practice, is illustrated in FIG. 4 where a network node 400 is split into one or more remote radio units 400A, denoted RRUs, and a central baseband unit 400B denoted BBU. This figure illustrates only one RRU for simplicity although such as network node may have any number of RRUs. Each RRU of such a split configuration could support one or more RATs. A so-called CPRI interface is implemented on the link between the RRU 400A and the BBU 400B in a conventional manner. In this case, the above-described non-GPP implemented processor operates on a non-GPP platform residing in the BBU 400B, while the above-described GPP implemented processor operates on a GPP platform 402. In this example, the RRU 400A is capable of communicating traffic signals of at least two different RATs denoted RAT1, RAT2, as processed by the BBU 400B and the GPP platform 402. In further examples, two RRUs may be used to support RAT1 and RAT2 where one RRU supports RAT1 while the other RRU supports RAT2, or both RRUs may support both RAT1 and RAT2.

It will now be described how the split configuration of FIG. 4 may be used when the first type of traffic is NB-IoT traffic and the second type of traffic is LTE traffic, as a non-limiting practical example.

The BBU side 400B has an added FH interface to the GPP-based platform 402, while the RRU 400A and the CPRI interface can remain unchanged. The FH data carried by CPRI contains both LTE FH data and NB-IoT FH data, while the added second FH interface between the BBU 400B and the GPP-based platform 402 carries FH data for the NB-IoT traffic.

For an in-band or guard-band deployment, NB-IoT traffic may use one or more resource blocks in an LTE carrier or may use a guard-band between adjacent LTE carriers. Then the FH data of the LTE antenna-carrier stream in CPRI include both LTE and NB-IoT components. In uplink, the FH data of the antenna-carrier stream is extracted and sent to a LTE module in the BBU 400B for processing. After FFT, the data of NB-IoT subcarriers are obtained. This data can be compressed further and is sent to the GPP-based platform 402 via the second FH interface. This data may also be referred to as "frequency domain FH data".

Then the GPP-based platform 402 further performs the second part of the baseband processing (e.g. demodulation, decoding, etc.) of the NB-IoT FH data and sends traffic data via the backhaul interface to the core network 210. A similar procedure can be employed in downlink such that the traffic data of NB-IoT from the core network 210 is modulated by the GPP-based platform 402 to frequency domain FH data. Then the frequency domain FH data (e.g. compressed) is sent by the GPP-based platform 402 to the BBU 400B via the second FH interface. The BBU 400B maps the NB-IoT FH data in frequency domain multiplexed with the LTE FH data and modulates them to a LTE antenna-carrier baseband signal via an IFFT operation. The signal is then encapsulated as a CPRI antenna-carrier stream and sent to the RRU 400A via the CPRI interface. The RRU 400A performs baseband-to-RF conversion and sends the RF signal to one or more wireless devices from the antennas.

For a "stand-alone" deployment, CPRI has separate NB-IoT antenna-carrier and LTE antenna-carrier streams. In this case, the NB-IoT FH data may not be processed in the LTE module in the BBU 400B. In uplink, the NB-IoT FH data extracted from CPRI may be compressed and is then sent to the GPP-based platform 402 via the second FH interface. In downlink, the NB-IoT data received by the BBU 400B from the GPP-based platform 402 may be decompressed, and is then encapsulated as NB-IoT antenna-carrier streams multiplexed with other LTE antenna-carrier streams in CPRI, and sent to the RRU 400A for transmission.

Figure 5A:
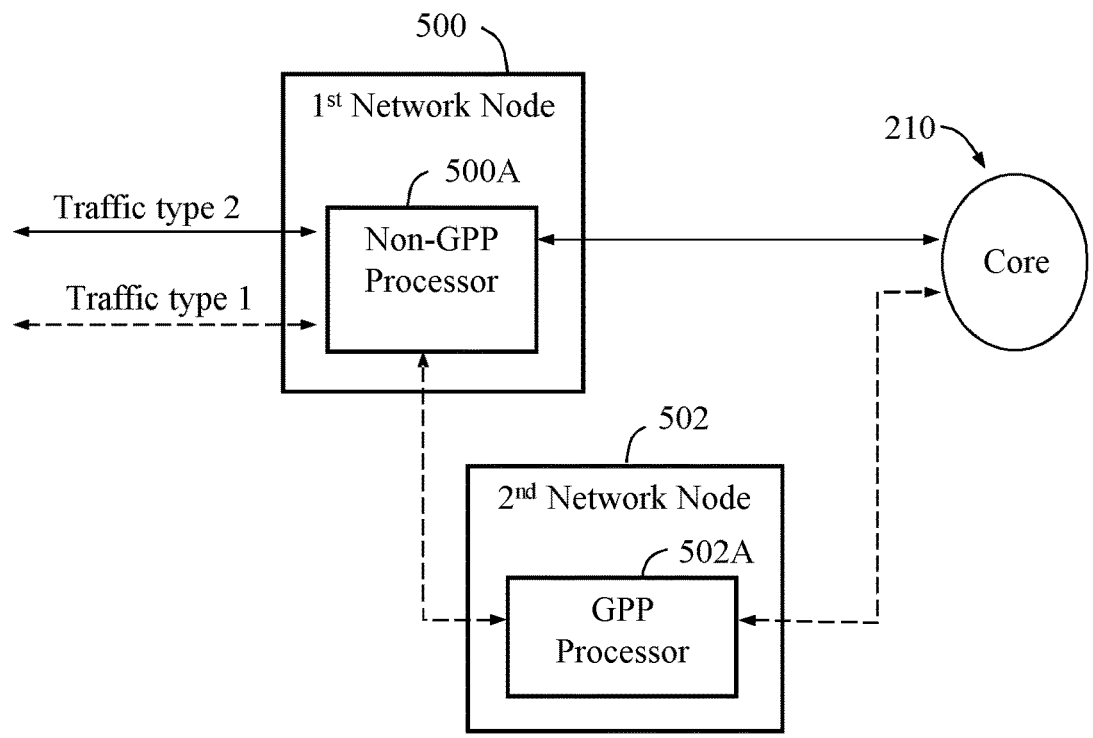
FIG. 5A is a block diagram illustrating a first example of how a GPP implemented processor may be employed by a first network node and a second network node, according to further example embodiments.

It was mentioned above that the non-GPP processor may reside in a base station or similar while the GPP processor may reside either in a server, pool or data center with available processing resources. FIG. 5A illustrates an example where a non-GPP processor 500A resides in a first network node 500 and a GPP processor 502A resides in a second network node 502. In this configuration, uplink and downlink traffic of the first type flows through the non-GPP processor 500A only, as illustrated by full two-way arrows, while uplink and downlink traffic of the second type flows through the non-GPP processor 500A for the first part of baseband processing and through the GPP processor 502A for the second part of baseband processing, as illustrated by dashed two-way arrows.

Figure 5B:
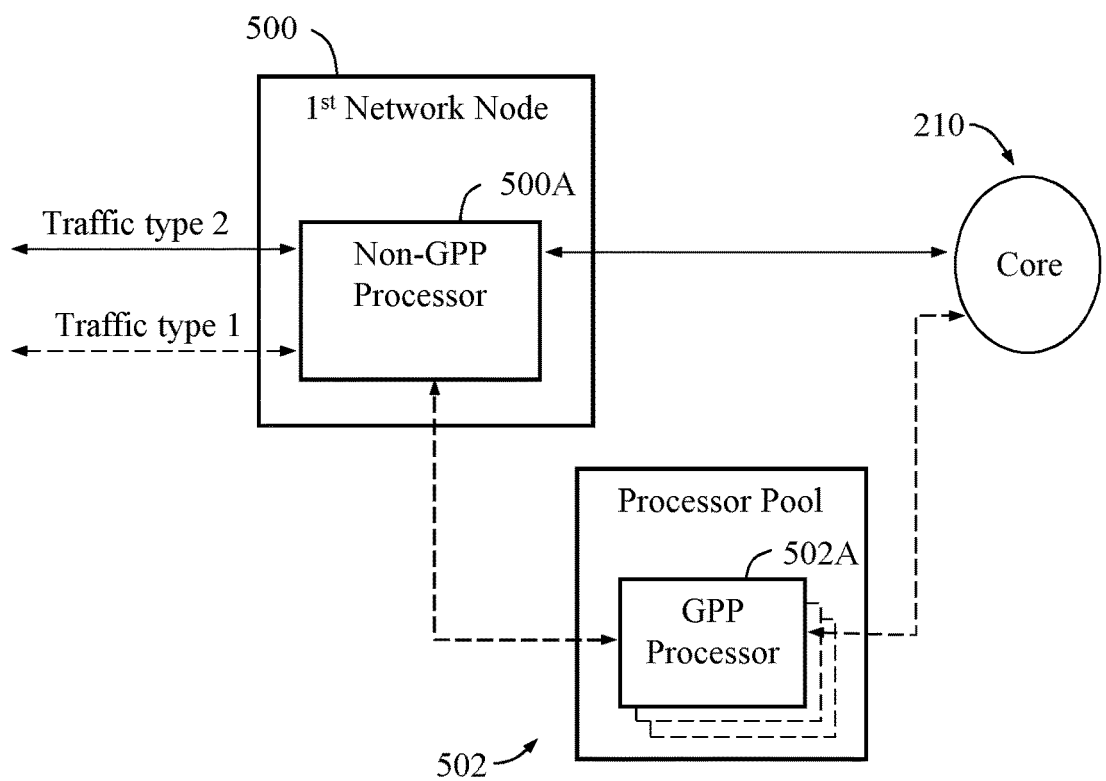
FIG. 5B is a block diagram illustrating a second example of how a GPP implemented processor may be employed by a first network node and a second network node, according to further example embodiments.

FIG. 5B illustrates another example where a non-GPP processor 500A resides in a first network node 500 and a GPP processor 502A resides in a pool of processing resources 502 corresponding to the above-described second network node. In this configuration, uplink and downlink traffic of the first type flows through the non-GPP processor 500A only, as illustrated by full two-way arrows, while uplink and downlink traffic of the second type flows through a non-GPP processor 500A in the network node 500 for the first part of baseband processing and through the GPP processor 502A in the pool 502 for the second part of baseband processing, as illustrated by dashed two-way arrows. In practice, two different non-GPP processors or the same non-GPP processor may be employed in the first network node 500 for both traffic types and the solution is not limited in this respect.

Figure 6:
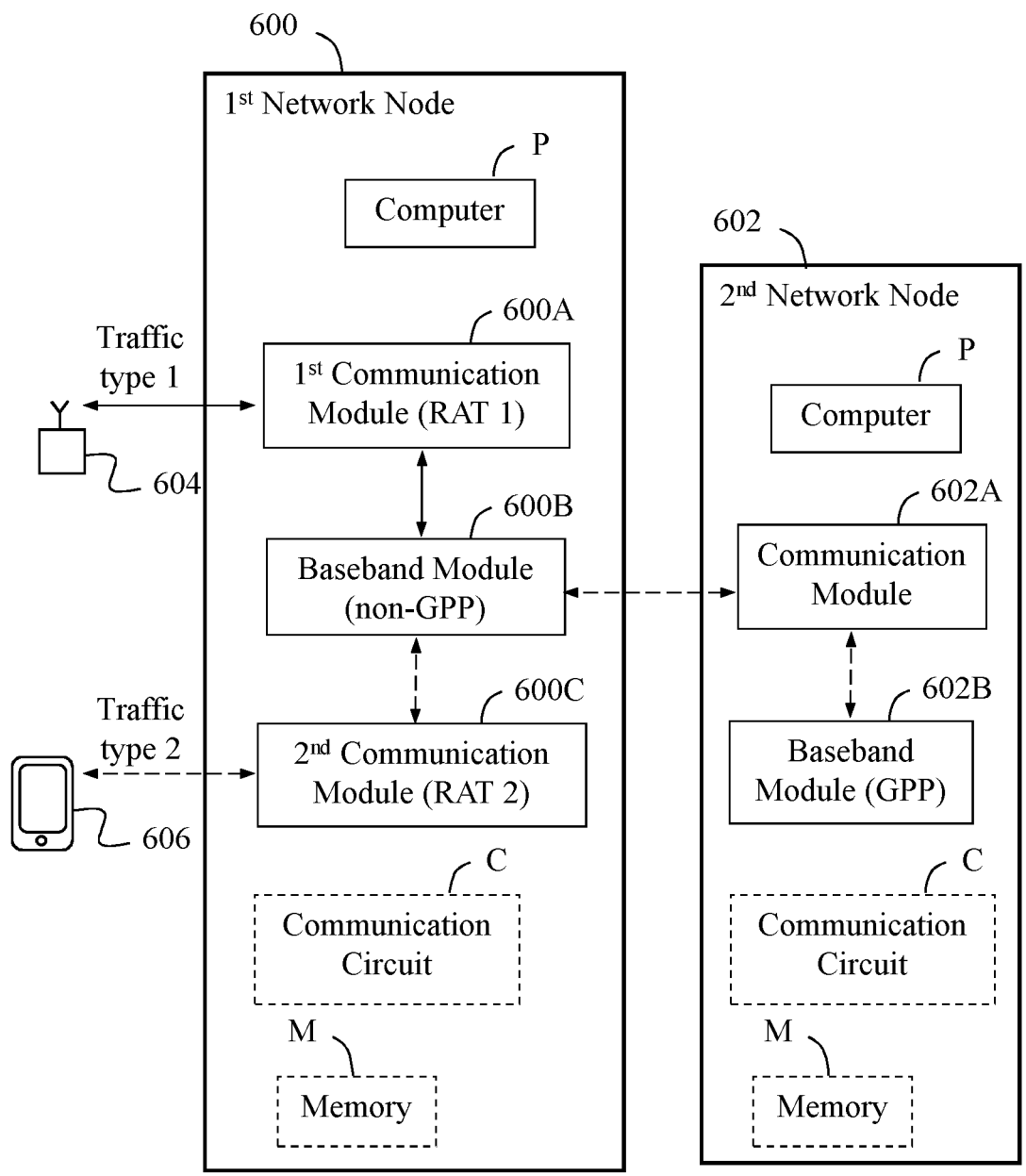
FIG. 6 is a block diagram illustrating another example of how a first network node and a second network node may be structured, according to further example embodiments.

The block diagram in FIG. 6 illustrates a detailed but non-limiting example of how a first network node 600 and a second network node 602 may be structured to bring about the above-described solution and embodiments thereof.

The first network node 600 may be configured to operate according to any of the examples and embodiments for employing the solution as described herein, where appropriate and as follows. The first network node 600 is shown to comprise a computer P and a memory M, said memory comprising computer instructions executable by the computer P so that the first network node 600 is operable as described herein. The first network node 600 also comprises a communication circuit C with suitable equipment for sending and receiving traffic signals in the manner described herein.

The communication circuit C may be configured for communication with wireless devices 604 and 606, corresponding to the wireless devices 204 and 206 in FIG. 2. Such communication may be performed using different RATs as described above. The communication circuit C may also be configured for communication with a second network node 602 corresponding to the second network node 202 in FIG. 2.

The first network node 600 comprises means configured or arranged to basically perform the actions in FIG. 3A, and more or less as described above for the first network node 200 or 500 in various examples. In FIG. 6, the first network node 600 is arranged or configured to handle baseband processing of signals communicated with wireless devices in a wireless network, as follows.

The first network node 600 is configured to communicate a first type of traffic signals with a first wireless device 604. This operation may be performed by a first communication module 600A in the network node 600, e.g. in the manner described above for action 300.

The network node 600 is further configured to perform a first part of baseband processing of the first type of traffic signals using a non-GPP implemented processor. This operation may be performed by a baseband module 600B in the network node 600, e.g. as described above for action 302.

The network node 600 is also configured to communicate the first type of traffic signals with a second network node 602 for a second part of baseband processing of the first type of traffic signals using a GPP implemented processor. This operation may be performed by the communication circuit C, depending on the implementation, basically as described above for action 304.

The network node 600 is further configured to communicate a second type of traffic signals with a second wireless device 606. This operation may be performed by a second communication module 600C in the network node 600, e.g. in the manner described above for action 306.

The network node 600 is further configured to perform both of said first and second parts of baseband processing of the second type of traffic signals using the non-GPP implemented processor. This operation may be performed by the baseband module 600B, e.g. as described above for action 308.

The second network node 602 may be configured to operate according to any of the examples and embodiments for employing the solution as described herein, where appropriate and as follows. The second network node 602 is likewise shown to comprise a computer P and a memory M, said memory comprising computer instructions executable by the computer P so that the second network node 602 is operable as described herein. The second network node 602 also comprises a communication circuit C with suitable equipment for sending and receiving traffic signals in the manner described herein. The communication circuit C may be configured for communication with a first network node 600 corresponding to the first network node 600 in FIG. 2.

The second network node 602 comprises means configured or arranged to basically perform the actions in FIG. 3A, and more or less as described above for the second network node 202 or 502 in various examples. In FIG. 6, the second network node 602 is arranged or configured to handle baseband processing of signals communicated with wireless devices in a wireless network, as follows.

The second network node 602 is configured to communicate a first type of traffic signals with a first network node 600 where a first part of baseband processing of the first type of traffic signals is performed using a non-GPP implemented processor. This operation may be performed by a communication module 602A in the second network node 602, e.g. in the manner described above for action 310.

The second network node 602 is also configured to perform a second part of baseband processing of the communicated first type of traffic signals using a GPP implemented processor. This operation may be performed by a baseband module 602B in the second network node 602, e.g. in the manner described above for action 312.

It should be noted that FIG. 6 illustrates various functional modules or units in the first network node 600 and the second network node 602, respectively, and the skilled person is able to implement these functional modules in practice using suitable software and hardware. Thus, the solution is generally not limited to the shown structures of the first network node 600 and the second network node 602, and the functional modules or units 600A-C and 602A-B therein may be configured to operate according to any of the features and embodiments described in this disclosure, where appropriate.

The functional modules or units 600A-C and 602A-B described above could thus be implemented in the first network node 600 and the second network node 602, respectively, by means of hardware and program modules of a computer program comprising code means which, when run by the computer P causes the first network node 600 and the second network node 602, respectively, to perform at least some of the above-described actions and procedures.

Each computer program may be carried by a computer program product in the first network node 600 and the second network node 602, respectively, in the form of a memory having a computer readable medium and being connected to the processor P. The computer program product or memory in the first network node 600 and the second network node 602, respectively, may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the first network node 600 and the second network node 602, respectively.

The solution described herein may thus be implemented in the first network node 600 and the second network node 602, respectively, by a computer program comprising instructions which, when executed on at least one computer, cause the at least one computer to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

While the solution has been described with reference to specific exemplifying embodiments, the description is generally only intended to illustrate the inventive concept and should not be taken as limiting the scope of the solution. For example, the terms "network node", "wireless device", "non-GPP implemented processor", "GPP implemented processor", "type of traffic signals", "remote radio unit", "central baseband unit" and "Radio Access Technology, RAT" have been used throughout this disclosure, although any other corresponding entities, functions, and/or parameters could also be used having the features and characteristics described here. The solution is defined by the appended claims.

The invention claimed is:

1. A method performed by a first network node for handling baseband processing of signals communicated between the first network node and wireless devices in a wireless network, the method comprising:
communicating a first type of traffic signals with a first wireless device;
performing a first part of baseband processing of the first type of traffic signals using a non-General Purpose Processor (GPP) implemented processor, wherein the first part of the baseband processing includes a signal pre-processing operation;
communicating the first type of traffic signals after the first part of the baseband processing to a second network node for a second part of the baseband processing of the first type of traffic signals using a GPP implemented processor to complete the baseband processing of the first type of traffic signals;
communicating a second type of traffic signals with a second wireless device; and
in response to the second type of traffic signals, instead of the first type of traffic signals, performing both the first part and the second part of the baseband processing of the second type of traffic signals using the non-GPP implemented processor at the first network node.

2. The method according to claim 1, wherein the first type of traffic signals tolerates a certain baseband processing delay and the second type of traffic signals does not tolerate said certain baseband processing delay.

3. The method according to claim 2, wherein the first type of traffic signals is tolerant to baseband processing delays above a predefined delay threshold and wherein the second type of traffic signals requires that baseband processing delays do not exceed the predefined delay threshold.

4. The method according to claim 1, wherein traffic signals of the first type are communicated using a first Radio Access Technology (RAT) and traffic signals of the second type are communicated using a second RAT.

5. The method according to claim 4, wherein the first RAT involves one or more of: Low-Power Wide-Area radio, Narrow Band radio, and short-range radio, and wherein the second RAT involves LTE, 5G or WiFi for wireless broadband applications.

6. The method according to claim 1, wherein the first part of the baseband processing includes the signal pre-processing operation of Fast Fourier Transform, Filterbank, or both Fast Fourier Transform and Filterbank, and wherein the second part of the baseband processing includes one or more baseband operations of modulation/demodulation, channel estimation, Forward Error Correction (FEC) coding/decoding and scheduling.

7. The method according to claim 1, wherein the non-GPP implemented processor comprises one or more of an Application-Specific Integrated Circuit (ASIC), a Digital Signal Processor and an FPGA.

8. The method according to claim 1, wherein the GPP implemented processor in the second network node is accessed from a pool of processing resources.

9. The method according to claim 1, wherein the traffic signals of the first type are communicated on a first antenna carrier stream, and the traffic signals of the second type are communicated on a second antenna carrier stream separate from the first antenna carrier stream.

10. The method according to claim 1, wherein the traffic signals of the first type and the traffic signals of the second type are communicated on a common antenna carrier stream.

11. A first network node to handle baseband processing of signals communicated between the first network node and wireless devices in a wireless network, wherein the first network node comprising:
 a processor; and
 a memory containing instructions which, when executed by the processor, cause the first network node to:
  communicate a first type of traffic signals with a first wireless device;
  perform a first part of baseband processing of the first type of traffic signals using a non-General Purpose Processor (GPP) implemented processor, wherein the first part of the baseband processing includes a signal pre-processing operation;
  communicate the first type of traffic signals after the first part of the baseband processing to a second network node for a second part of the baseband processing of the first type of traffic signals using a GPP implemented processor to complete the baseband processing of the first type of traffic signals;
  communicate a second type of traffic signals with a second wireless device; and
  in response to the second type of traffic signals, instead of the first type of traffic signals, perform both the first part and the second part of the baseband processing of the second type of traffic signals using the non-GPP implemented processor at the first network node.

12. The first network node according to claim 11, wherein the first type of traffic signals tolerates a certain baseband processing delay and the second type of traffic signals does not tolerate said certain baseband processing delay.

13. The first network node according to claim 12, wherein the first type of traffic signals is tolerant to baseband processing delays above a predefined delay threshold and wherein the second type of traffic signals requires that baseband processing delays do not exceed the predefined delay threshold.

14. The first network node according to claim 11, wherein the first network node is to communicate traffic signals of the first type using a first Radio Access Technology (RAT) and to communicate traffic signals of the second type using a second RAT.

15. The first network node according to claim 14, wherein the first RAT involves one or more of: Low-Power Wide-Area radio, Narrow Band radio, and short-range radio, and wherein the second RAT involves LTE, 5G or WiFi for wireless broadband applications.

16. The first network node according to claim 11, wherein the first part of the baseband processing includes the signal pre-processing operation of Fast Fourier Transform, Filterbank, or both Fast Fourier Transform and Filterbank, and wherein the second part of the baseband processing includes one or more baseband operations of modulation/demodulation, channel estimation, Forward Error Correction (FEC) coding/decoding and scheduling.

17. The first network node according to claim 11, wherein the non-GPP implemented processor comprises any of an Application-Specific Integrated Circuit (ASIC) a Digital Signal Processor (DSP) and an FPGA.

18. The first network node according to claim 11, wherein the first network node is to access the GPP implemented processor in the second network node from a pool of processing resources.

19. The first network node according to claim 11, wherein the first network node is to communicate the traffic signals of the first type on a first antenna carrier stream, and to communicate the traffic signals of the second type on a second antenna carrier stream separate from the first antenna carrier stream.

20. The first network node according to claim 11, wherein the first network node is to communicate the traffic signals of the first type and the traffic signals of the second type on a common antenna carrier stream.

\* \* \* \* \*

UNITED STATES PATENT AND TRADEMARK OFFICE
CERTIFICATE OF CORRECTION

PATENT NO. : 11,595,843 B2
APPLICATION NO. : 16/958096
DATED : February 28, 2023
INVENTOR(S) : Lu et al.

It is certified that error appears in the above-identified patent and that said Letters Patent is hereby corrected as shown below:

In the Specification

In Column 3, Line 4, delete "exiting" and insert -- existing --, therefor.

In Column 6, Line 26, delete "(narrowband," and insert -- (narrow band, --, therefor.

Signed and Sealed this
Tenth Day of October, 2023

Katherine Kelly Vidal
*Director of the United States Patent and Trademark Office*